(12) United States Patent
Tandur et al.

(10) Patent No.: US 10,931,551 B2
(45) Date of Patent: Feb. 23, 2021

(54) CONDITION MONITORING OF WIRELESS NETWORKS IN INDUSTRIAL PLANTS

(71) Applicant: ABB Schweiz AG, Baden (CH)

(72) Inventors: Deepaknath Tandur, Bangalore (IN); Anand Rath, Bhubaneshwar (IN); Anitha Varghese, Bangalore (IN)

(73) Assignee: ABB Power Grids Switzerland AG, Baden (CH)

(*) Notice: Subject to any disclaimer, the term of this patent is extended or adjusted under 35 U.S.C. 154(b) by 0 days.

(21) Appl. No.: 16/427,323

(22) Filed: May 30, 2019

(65) Prior Publication Data
US 2019/0372872 A1 Dec. 5, 2019

(30) Foreign Application Priority Data
May 31, 2018 (IN) .............................. 201841020366
Jul. 18, 2018 (EP) ...................................... 18184220

(51) Int. Cl.
*H04L 12/26* (2006.01)
*H04B 17/336* (2015.01)
(Continued)

(52) U.S. Cl.
CPC ...... *H04L 43/0811* (2013.01); *G05B 19/4185* (2013.01); *H04B 17/336* (2015.01);
(Continued)

(58) Field of Classification Search
CPC ...... G05B 19/4185; G05B 2219/31162; G05B 2219/31346; G05B 2219/31348;
(Continued)

(56) References Cited

U.S. PATENT DOCUMENTS

| | | | | |
|---|---|---|---|---|
| 2003/0166394 A1* | 9/2003 | Tsien | ................... | H04L 1/0002 370/468 |
| 2007/0161371 A1* | 7/2007 | Dobrowski | ........... | H04L 43/045 455/423 |

(Continued)

FOREIGN PATENT DOCUMENTS

| | | |
|---|---|---|
| CN | 202334597 U | 7/2012 |
| EP | 2466798 A1 | 6/2012 |

(Continued)

OTHER PUBLICATIONS

European Search Report for EP 18184220.4-1216, dated Oct. 19, 2018, 9 pages.

*Primary Examiner* — Kashif Siddiqui
(74) *Attorney, Agent, or Firm* — Slater Matsil, LLP

(57) ABSTRACT

The present disclosure relates to condition monitoring of wireless networks in industrial plant, wherein a wireless network has two or more wired gateways and a plurality of access nodes connected wirelessly with at least one wired gateway. Here, each access node is associated with at least one field device of the industrial plant. The condition monitoring is performed with an industrial device connected with the two or more wired gateways. The condition monitoring comprises periodically receiving information associated with packet transfer, channel access, and connection links for each node of the plurality of access nodes and each wired gateway. One or more parameters are estimated based on the received information, to determine connectivity status of the field devices in the industrial plant. The connectivity status is rendered on a user interface of an industrial device.

20 Claims, 6 Drawing Sheets

(51) Int. Cl.
*G05B 19/418* (2006.01)
*H04W 88/16* (2009.01)

(52) U.S. Cl.
CPC ........ *H04L 43/045* (2013.01); *H04L 43/0829* (2013.01); *H04W 88/16* (2013.01); *G05B 2219/31162* (2013.01); *G05B 2219/31346* (2013.01); *G05B 2219/31348* (2013.01)

(58) Field of Classification Search
CPC . H04B 17/336; H04L 43/045; H04L 43/0811; H04L 43/0823; H04L 43/0829; H04L 43/0894; H04W 88/16
See application file for complete search history.

(56) References Cited

U.S. PATENT DOCUMENTS

| | | | |
|---|---|---|---|
| 2014/0370820 A1* | 12/2014 | Pulini | H04W 24/08 455/67.7 |
| 2016/0352592 A1* | 12/2016 | Sasaki | G05B 19/0428 |
| 2017/0070977 A1 | 3/2017 | Dahlman et al. | |

FOREIGN PATENT DOCUMENTS

| | | |
|---|---|---|
| EP | 2814224 A1 | 12/2014 |
| EP | 3104582 A1 | 12/2016 |

* cited by examiner

| Node ID | Success Rate | Traffic | Channel, Attempts | Time | Parent | Neighbors |
|---|---|---|---|---|---|---|
| Access Node 15a | 40/50 | 0.7 | 1, 0 | 11:00 am, May 18, 2018 | GW10a | 2, GW10a, AN15c |
| Access Node 15b | 25/20 | 0.4 | 1, 3 | 11:00 am, May 18, 2018 | GW10a | 1, GW 10a |
| ... | ... | ... | ... | ... | ... | ... |
| Access Node 15n | 45/30 | 0.4 | 5, 0 | 11:00 am, May 18, 2018 | AN15x | 3, AN15x1, AN15x2, AN15x3 |

FIG. 4

CONDITION MONITORING OF WIRELESS NETWORKS IN INDUSTRIAL PLANTS

CROSS-REFERENCE TO RELATED APPLICATIONS

This application claims priority to European Patent Application No. 18184220.4, filed on Jul. 18, 2018, and to Indian Patent Application No. 201841020366, filed on May 31, 2018. The entire disclosures of each of the foregoing applications are incorporated herein by reference in their entirety.

TECHNICAL FIELD

The present disclosure generally relates to communication in industrial plants. More specifically, the present disclosure relates to condition monitoring of wireless networks in industrial plants.

BACKGROUND

An industrial plant comprises a wide variety of industrial devices/equipment connected over different networks. For example, the industrial plant can have connectivity at component, system, and/or network level, over one or more of, but not limited to, a plant network, a control network, a field network, and an external network (e.g. cloud, internet etc.). In such industrial environments, field devices such as, analytical equipment, sensors etc., can be connected to communicate with a remote device (e.g. plant server, control system etc.). For example, a plurality of field devices may be connected in a wireless network in the plant.

A wireless network (e.g. a mesh network) in an industrial plant can have wired gateways and access nodes. There can be one or multiple wired gateways, which can simultaneously be members of wired and wireless networks. In such a wireless network, a wired gateway can serve multiple access nodes (e.g. about 10-100 access nodes) and thereby the associated field devices. Here, the access nodes are connected with the gateway device wirelessly (or through other connections). Further, such connection may be a direct connection to the gateway, or through another access node(s) which is/are connected to the gateway. Thus, a field device (via an access node) can access the wired network through the wired gateway directly (wirelessly), or by hopping to the gateway through another node(s).

Routing algorithms and other MAC layer mechanisms, can decide on the paths and links during the configuration/training window stage based on metrics from Phy and MAC layers. However, the bottlenecks and performance deficiencies due to change in network conditions (e.g. path changes, increased traffic, appearance of hidden nodes etc.) can never be accurately foreseen and averted by any pre-deployment planning or network design strategies or even by mechanisms that make decisions during a certain configuration window.

Consider changes occurring in the network, after it is operational, such as additional sensors being added to the network. As a result, some access nodes could face bandwidth/traffic issues, because they have to serve more field devices, or send more data than were previously handling. Alternately, consider a case where field devices are sending lot of process data. During design, access nodes may have been configured to handle certain predetermined amount of traffic. However, during operation, due to the dynamic nature of the network, the actual demand may be much higher, leading to transmission losses. Similarly, during design/training, some access nodes may not have been considered, which can create interference during operation.

Thus in real-time, field devices may suffer from connectivity issues as conditions during operation of an industrial plant may be quite different than during the planning stage. Additionally, the connectivity issues may arise because of issues with the access node(s) it is using for communication, or as a result of upstream or downstream network components. Network conditions changing over time may result in change of communication performances of various network components, which may not be detectable at a node or gateway level. Such information is not typically available with industrial personnel, and may be critical for control or monitoring purposes (e.g. in a process control system).

There is accordingly need for condition monitoring of wireless networks in such industrial plants, to enhance connectivity of field devices during operation. Further, such condition monitoring information should be readily available with industry personnel.

SUMMARY

The present disclosure relates to condition monitoring of a wireless network in an industrial plant. The wireless network can be an industrial mesh network. The wireless network comprises two or more wired gateways and a plurality of access nodes. Each access node is wirelessly connected with at least one wired gateway. Various field devices access the wired network through access nodes. Accordingly, each access node is associated with at least one field device.

According to one aspect of the present disclosure, a method is implemented with an industrial device. The industrial device can be a plant server connected with the two or more wired gateways.

The method comprises periodically receiving information associated with packet transfer, channel access, and communication links from each access node (via corresponding wired gateway) and each wired gateway. The industrial device comprises an input interface, for periodically receiving the information. The information may be stored in a storage associated with the industrial device. For example, a database or other storage available with the industrial device.

The method also comprises estimating from the received information one or more parameters associated with each access node. The one or more parameters are estimated based on information associated with one or more packet transfer, channel access and communication links. The estimation of the one or more parameters is performed with a processor(s) of the industrial device. Alternately, the estimation of the one or more parameters may be performed by an access node, a corresponding wired gateway and the industrial device, in which case information available with the node or gateway is used to arrive at some estimations, which are communicated to the industrial device for further analysis.

The information associated with packet transfer can have information associated with a number of packets transmitted from the access node to the corresponding gateway, and a corresponding number of responses received from the corresponding gateway. The information associated with packet transfer can also have a number of packets transmitted from the gateway to the access node, and a corresponding number of responses received from the access node.

In an embodiment, the information associated with packet transfer is used to estimate one or more rates of packet transfer. The rate of packet transfer for an access node can be a ratio of the number of packets transmitted from the access node to the corresponding gateway, and the corresponding number of responses received from the corresponding gateway. The ratio of packet transfer for the access node can also be the number of packets transmitted from the corresponding gateway to the access node, and the corresponding number of responses received from the access node.

The information associated with channel access can have the information of wireless communication channels used by the access node and one of a neighboring access node and the corresponding gateway. The neighboring access node can be a parent for the access node, which can serve as a hop to the gateway or another access node connected with the gateway. Additionally, the information associated with channel access can have information about a number of attempts made by the access node to switch (or connect to) wireless communication channels.

In an embodiment, the information associated with channel access is used to estimate a channel error. An access node can be determined with a channel error based on the difference in wireless communication channels used by the access node and one of the neighboring access node and the corresponding gateway. Also, the number of attempts made by the access node to switch wireless communication channels can be used to determine the channel error for the access node.

The information associated with communication links can have information a number of access nodes and wired gateways connected with the access node, and identity of the corresponding access nodes and wired gateways, and a data traffic of the access node.

In an embodiment, the information associated with the communication links is used to estimate a stability factor for each access node. The stability factor can be determined based on the difference in the number of access nodes and wired gateways connected with the access node at different time instances. The determination can also be based on the difference in the identity of the corresponding access nodes and wired gateways at the different time instances.

In an embodiment, the information associated with the communication links is used to estimate a rate of data transfer. The rate of data transfer is determined based on a comparison of the data traffic and a signal to noise ratio for the access node.

In an embodiment, the rate of packet transfer, the channel error, the stability factor and the rate of data transfer are estimated for each node. These parameters are estimated by the industrial device (or by the access node, the gateway and/or the industrial device).

The method further comprises determining a connectivity status of the field devices, based on the one or more parameters estimated for each access node. The determination of the connectivity status as for the parameters is performed by the industrial device (i.e. by the processor, or by the access node, the gateway and/or the industrial device).

The connectivity status of a field device is determined based on a connectivity status of one or more access nodes used by the field device for accessing the wired network. Here, at least a first access node of the one or more access nodes may connect with a corresponding wired gateway via at least a second access node (i.e. acting as a hop between the access node that the field device is connected directly with). The connectivity status of each access node may be determined from the one or more parameters estimated for the access node.

In an embodiment, determining the connectivity status of the field device comprises comparing the rate of packet transfer for each access node associated the field device with a threshold value for the rate. In accordance with another embodiment, determining the connectivity status of the field device also comprises comparing one or more of the wireless communication channels used by the access node and one of the neighboring access node and the corresponding gateway; the number of access nodes and wired gateways connected with the access node with a corresponding threshold value; and the data traffic of the access node with a signal-to-noise ratio of the access node.

The connectivity status of the field devices is rendered on a user interface associated with the industrial device. The rendering may be performed with the processor of the industrial device. Here, rendering the connectivity status of the field devices can comprise displaying the connectivity status of one or more clusters of access nodes. Further, a recommendation for at least one field device based on the connectivity status may be displayed.

BRIEF DESCRIPTION OF DRAWINGS

The subject matter of the present disclosure will be explained in more detail in the following text with reference to exemplary embodiments which are illustrated in attached drawings in which:

FIG. 4 is an example table of information with the industrial device, in accordance with an embodiment;

DETAILED DESCRIPTION OF THE DRAWINGS

The present disclosure is related to industrial plants such as, but not limited to, oil plants/rigs, mining plants, steel plants, paper plants, chemical plants, power plants, and wind/solar power generation plants. Such industrial plants can have connectivity at one or more network levels. The connectivity can be enabled through one or more networks including, but not limited to, a plant network, a control network, a field network, and an external network (e.g. cloud, Internet etc.). The present disclosure is specifically in relation to condition monitoring of wireless networks in such industrial environments. The wireless network can be an industrial mesh network.

Figure 1:
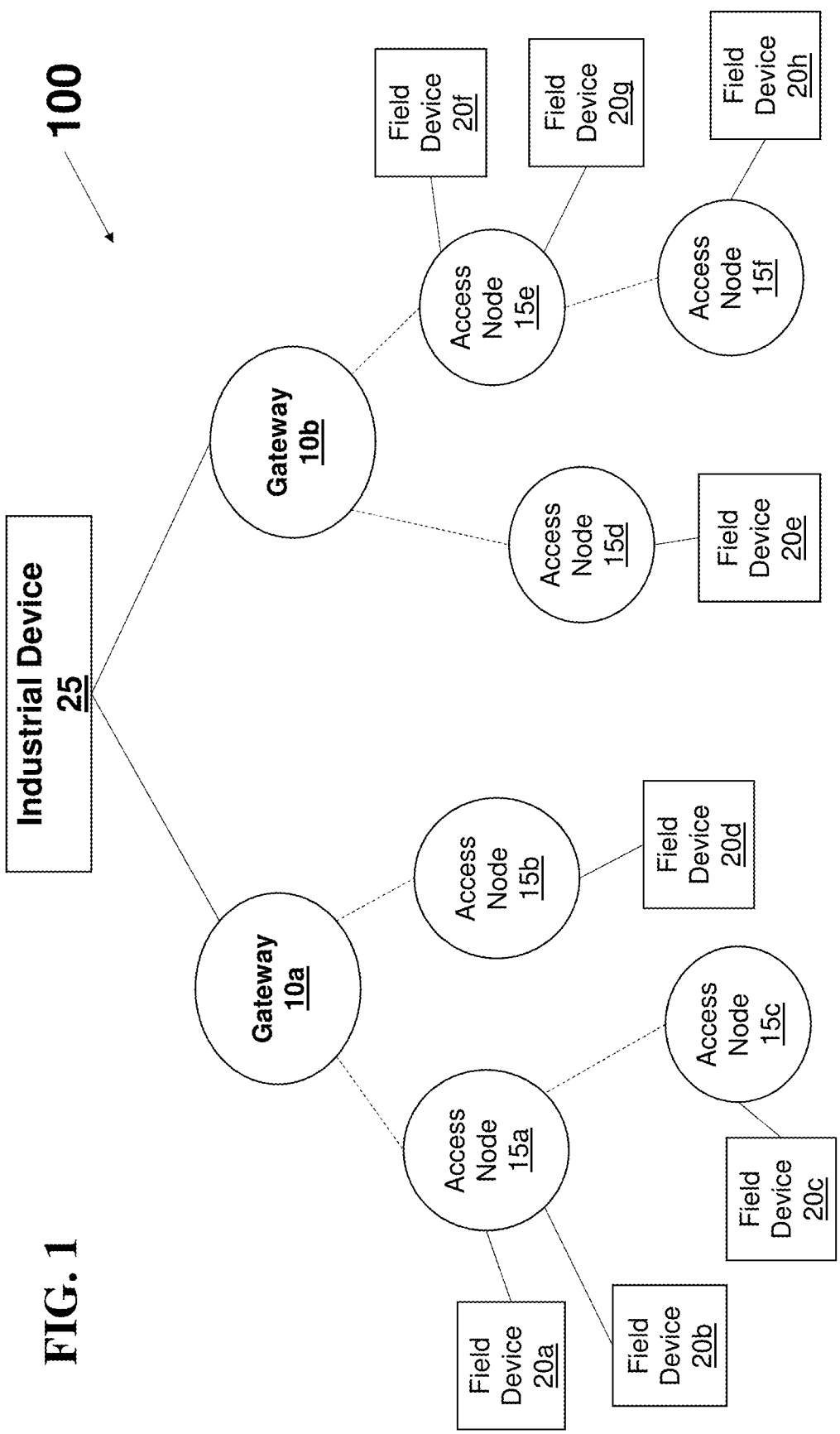
FIG. 1 shows a system with a wireless network of an industrial plant, in accordance with an embodiment.

FIG. 1 shows a system (100) which comprises a wireless network of an industrial plant, in accordance with an embodiment. The wireless network comprises two or more wired gateways (10a, 10b . . . ) and a plurality of access nodes (15a, 15b . . . ). A wired gateway (or gateway) is connected on a wired network and a wireless network. The gateway may be a gateway device (e.g. a server), which provides an interface between a wireless network protocol and a wired or another wireless network protocol. The wired network can be Ethernet or other such high speed networks, and the gateway can be connected to different networks inside/external to the plant through the wired network, and other components connected to the wired network.

Multiple access nodes can be served by one wired gateway (such as 10a). For example, up to 100 access nodes may be served by a single wired gateway. The access nodes are connected wirelessly in the network. For example, an access node can be a wireless router that provides wireless connectivity to devices connected to it. An access node may connect with the gateway directly (such as access node 15a, 15b etc.), or by hopping through one or more nodes (such as 15c). The access node may wirelessly connect to different gateways, or access nodes according to the network conditions.

Consider a case, where a gateway (e.g. 10a) is busy serving to traffic from an access node (say 15a). In such a case, other access nodes (say 15b) may not be able to successfully connect/utilize the communication channel, and try to connect to other gateways (e.g. 10b). Similarly, when access nodes are communicating via other access nodes, there may be change in links between access nodes. Consider the case of access node 15c. This node may connect wirelessly with access node 15a or access node 15b. Based on the network conditions, at one point in time access node 15c may be connected to access node 15a, while at a different time instance, to access node 15b.

One or more field devices (20a, 20b . . . ) can be connected to an access node. Thus, a field device such as a pressure sensor, flowmeter etc., may be connected with a wireless router, which provides connectivity to the field device. The field devices are in communication with one or more systems/equipment in the plant via the access nodes they are connected to. There could be connectivity issues with an access node a field device is connected with, or with the gateway the access node is connected with, or with another access node serving as a hop(s) for the access node the field device is connected to. The connectivity issues may relate to operation of the field device, or due to network issues. For example, a field device may not have connectivity with its access node, as the wireless medium is continuously being utilized by another field device connected with the same access node. Taking another example, a field device has a good connectivity with its access node, however in an upstream access node, there is a bottleneck (interference, traffic overload etc.) resulting in poor connectivity of the respective field device.

Thus, at some point in time, the field device may lose connectivity as a result of the access node losing connectivity, or a linked network component (i.e. the hop(s) or the gateway) losing connectivity.

Figure 2:
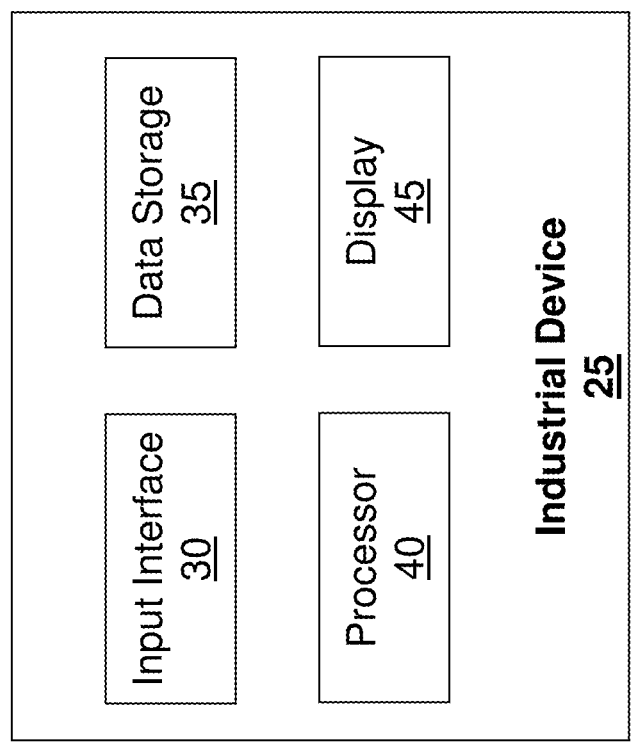
FIG. 2 shows a simplified block diagram of an industrial device for condition monitoring of the wireless network, in accordance with an embodiment.

The components of the wireless network are monitored with an industrial device (25). The industrial device may be a plant server, or a gateway device, connected with the wired gateways for the monitoring. For example, the industrial device can be part of a distributed control system connected with the field devices through the corresponding wired gateways and access nodes. FIG. 2 is a simplified block diagram of the industrial device, in accordance with an embodiment. As shown the industrial device has an input interface (30), a data storage (35), a processor (40), and a display (45).

The input interface can include I/O's of the industrial device that connect the industrial device with the gateways (i.e. over the network). Thus, the industrial device can communicate with other network components through the I/O's. It is to be noted that the industrial device receives information about the gateways and the access nodes, through the wired gateways. In other words, the field devices (or access nodes) communicate with the industrial device via the corresponding gateways.

The information received from the gateways can be stored in the data storage, which may be a local disk or drive. Alternately, the information may be stored in a data storage external to the industrial device (e.g. a database connected with the plant server). Each access node and gateway can send information periodically (e.g. every few minutes, hourly etc. as configured), during operation of the plant. Thus, the industrial device has information from all the gateways and access nodes, over a period of time.

The information received by the industrial device, can be processed with the processor for various purposes. For example, the processor can estimating one or more parameters for one or more of each access node, a cluster of access nodes, and a neighborhood of access nodes. Taking another example, the processor can determine connectivity status of field devices, generate recommendations according to the connectivity status etc. Such processed information (or interfaces created using the processing results), can be displayed on the display of the industrial device, or communicated to a connected device for display (e.g. a connected computer, or handheld device etc.).

The industrial device learns about the network components and possibly different communication links between various network components by continuously observing and understanding them over time. The analysis is independent of the geographic location related information and works on communication links. Given sufficient time (for example, days or weeks), the industrial device can understand nearly all the possible communication links that exists in the wireless network and also the impact of the different network components that is possible over any given link in the network. The industrial device continuously becomes smarter over time, and can monitor the condition of the wireless network and as well as provide recommendations (e.g. to a network manager).

Figure 3:
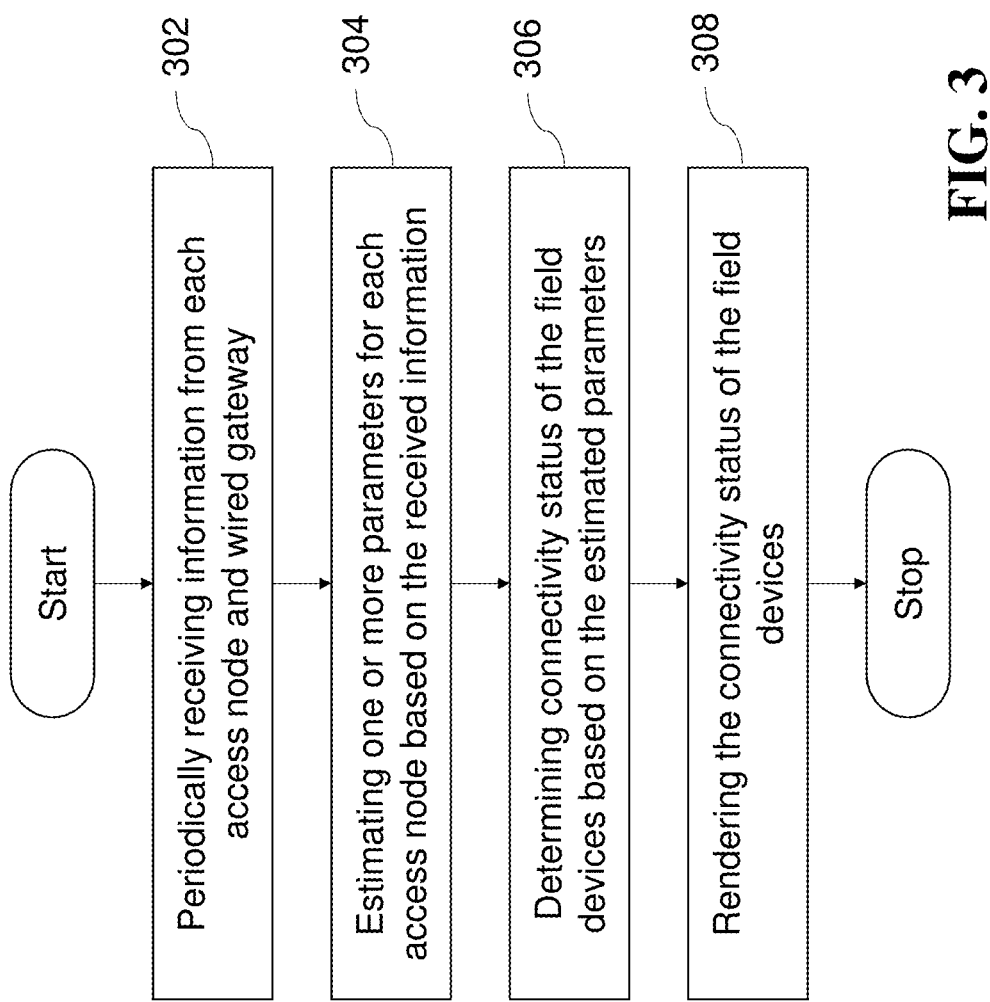
FIG. 3 is a flowchart of a method for condition monitoring of the wireless network, in accordance with an embodiment.

Referring now to FIG. 3, which is a flowchart of a method for condition monitoring of the wireless network, in accordance with an embodiment. Various steps of the method may be performed by the industrial device, or at least in part by the industrial device, wherein some steps may be performed by an access node or a gateway, and the results communicated to the industrial device.

At 302, information associated with packet transfer, channel access, and communication links is received from each access node (via corresponding gateway) and each gateway. Information associated with packet transfer can be associated with volume of packets, success rates of packet transmission etc. Similarly, information associated with channel access can have information about channel used, attempts to use/switch channel etc. Likewise, the information associated with communication links can have information about link quality, signal-to-noise ratio, number of neighbors, identity of neighbors, actual data traffic etc.

The information that an access node, or a gateway sends to the industrial device can be pre-configured. For example, it can be configured that an access node sends rates associated with packet transfer, information concerning packets originating from/received at the access node etc.

The industrial device can store the information received from the access nodes/gateways according to time instances. FIG. 4 shows an example table with information from access nodes. Such storage may be of the information as received from the node/gateway, or as estimated by the industrial device. For example, the success rate may be sent by the node/gateway, or estimated by the industrial device.

Various inferences can be drawn about the wireless network based on the information collected at different points in history. Consider a wireless network to have neighborhoods. A neighborhood can be seen as a self-contained sub-network which does not interfere or share traffic with any other neighborhood. Thus, a neighborhood has clusters of access nodes that are independent of other clusters/neighborhoods. In other words, a neighborhood has one or more clusters that are related (i.e. have common access nodes, or hopping nodes (nodes moving between clusters), or communication between cluster heads etc.). A cluster has a cluster head (gateway) and one or more branches, wherein each branch has one or more access nodes. For example, gateway 10a, access nodes 15a, 15b, 15c can be seen as one cluster.

Inferences can be drawn about the neighborhood structure at different points in history. The neighborhood structure can be considered according to a network hierarchy that is for example from a router, a branch, a cluster, a neighborhood and then as the complete network itself. The inferences are made according to analysis of the information collected for the access nodes and/or gateways.

In accordance with the embodiment of FIG. 3, one or more parameters associated with each access node are estimated at 304. The industrial device estimates these parameters, or receives the parameter for each time instance as estimated by the node or the gateway. Such parameters are used to draw the inferences about the network structure. For example, which nodes are healthy, which nodes are switching channels, which nodes are members of a cluster, which nodes are part of a neighborhood, which nodes are jumping between clusters etc.

In an embodiment, the following parameters are estimated for each access node, for each time instance:
Packet Success Rate (PSR)
Reverse Packet Success Rate (RPSR):
Channel Error
Stability Factor
Data Traffic Rate (DTR)

In accordance with the embodiment, the PSR/RPSR is estimated from the following equation:

$$PSR = \frac{\text{Number of packets transmitted by the access node to the gateway}}{\text{Number of responses received at the acess node for the packets sent}}$$

$$RPSR = \frac{\text{Number of packets transmitted by the gateway to the access node}}{\text{Number of responses received at the gateway for the packets sent}}$$

The PSR/RPSR estimation may be performed by the access node, the gateway or the industrial device.

The channel error is estimated based on wireless communication channel used the access node, the parent of the access node, the gateway or any hop between the access node and the gateway. Additionally, number of attempts made to switch (or connect to) the wireless communication channel is used. An access node can be said to have a channel error if the access node or any other upstream component connected in the same branch of the wireless network has a channel error. Thus, an access node has no channel error (e.g. channel error=0) only if all access nodes and corresponding gateway is free of channel errors.

In accordance with the embodiment, an access node is determined with a channel error (e.g. channel error=1), if the wireless communication channel used by the access node (on the same frequency band), is different from the wireless communication channel used by its parent, or if the number of attempts made to switch channels is less than a threshold value. Here, the parent can be a neighboring access node or gateway that is immediately connection to the access node for connecting to the wired network.

The stability factor for an access node is estimated based on the relationship between the access node and other nodes in the network. More specifically, the stability factor is dependent on the node's relationship with its parent across different time instances, where the parent can be another access node or the gateway. In accordance with the embodiment, the stability factor (SF) for an access node is $$SF = \frac{\text{Number of new parents } (T+1)}{\text{Number of parents } (T)}$$

In the above equation, a new parent would mean a new access node/gateway to which an access node connects to at time instance (T+1) as compared to time instant (T).

The DTR is based on the actual data traffic at the access node and a signal-to-noise ratio (SNR) for the node. In accordance with the embodiment, the DTR is given by:

$$DTR = \frac{\text{Actual Data Traffic}}{\text{Maximum data traffic according to } SNR}$$

Similarly, parameters can be estimated for clusters and neighborhoods. In an embodiment, the following parameters are estimated for a cluster:
Channel errors
Performance errors
Stability Factor The channel error for a cluster depends on:
Number of nodes in the cluster with channel errors
Number of nodes in each branch impacted by channel errors The performance errors for a cluster is obtained based on:
Total number of nodes suffering PSR/RPSR<30% (threshold).

The stability factor within a cluster is determined by:
Number of nodes that have continued with same parent/(Number of nodes that have continued with same parent+nodes that left the cluster+nodes that joined the cluster)

The parameters for a neighborhood can be based on inter-cluster movement:
Clusters affected by inter-cluster movement
Nodes affected by change of parents
Stability factor The number of clusters affected by inter-cluster movement can be identified from the number of neighbors (connected nodes), and by quantifying the number of nodes that left and joined in from respective clusters.

The nodes affected by change of parents can be identified by identifying parent of every node that has hopped, along with PSR/RPSR relationship with the new parent.

The stability factor at time Tn as inter-cluster movement:
No of nodes that have continued in the cluster/(No of nodes that have continued in the cluster+nodes left+nodes joined)

Thus for a neighborhood, following can be performed:
Group the neighbors of cluster until time Tn.
Quantify nodes affected within the neighborhood in terms of the following:
% of nodes impacted by channel errors
% of nodes impacted by performance errors
Further classification—Range, Interference, Traffic
Stability factor of neighborhood—Total no of nodes that have remained with the same parent/Neighborhood size The various parameters estimated can be used to estimate connectivity status of different network components.

In accordance with the embodiment of FIG. 3, the parameters estimated for each access node is used to determine the connectivity status of the field devices at 306. The determination of the connectivity status as for the parameters is performed by the industrial device (i.e. by the processor, or by the access node, the gateway and/or the industrial device).

The connectivity status of a field device is determined based on the connectivity status of one or more access nodes used by the field device for accessing the wired network. For example, the access node a field device is connected with can have a problem. Alternately, an upstream node (access node/gateway) may have a problem, which affects the field device connectivity in the wireless network.

In accordance with an embodiment, the connectivity status for each access node is determined from one or more of the following:
PSR for the access node is less than a PSR threshold (e.g. 30%)
RPSR for the access node is less than a RPSR threshold (e.g. 30%)
Whether access node has channel error
Stability factor for the node is above a SF threshold (e.g. 0.3)
DTR is above a DTR threshold (e.g. 0.7)

The thresholds can be set by a user, or learnt by the industrial device over time. For example the PSR, RPSR, stability factor, and DTR may be set by the user, or started with a default value and updated at different time instances.

According to the parameters estimated and the criteria (threshold etc.), an access node may be determined to have a performance issue, which affects the field device it is connected with. For example, a node may have a performance issue as a result of too many neighbors/interference, traffic more than the node can handle (Data rate*Tx/Rx time compared to path loss (SNR+Tx power), range too large (large PSR/RPSR drop without neighbors/interference/traffic issue).

Such determination may be performed for clusters and neighborhoods. For example, a cluster may have many nodes with performance issues, or many branches with affected nodes, node movement between clusters affecting the clusters etc. Similarly, neighborhood performance can be determined according to performance of clusters in the neighborhood, and relationship between clusters of the neighborhood.

A recommendation can be generated based on the connectivity status of the field device. For example, if there is a channel error, recommendation can be set access node channel to parent channel. Taking another example, if there is a PSR/RPSR issue, then according to the number of neighbors and the DTR, recommendation can be to go for load balancing, as the node may have too much interference, or because of a low SNR.

The connectivity status of the field devices is rendered on a user interface (e.g. the display) associated with the industrial device at 308. The rendering may be performed with the processor of the industrial device. Here, rendering the connectivity status of the field devices can comprise displaying the connectivity status of one or more clusters of access nodes. Further, the recommendation for at least one field device based on the connectivity status may be displayed.

The presently disclosed systems and methods assist in drawing inferences about wireless networks over different periods of time. This allows to provide suitable recommendation about field device connectivity in industrial plants. Such information can be percolated right from the lowest to the highest hierarchical level. A large network can be broken into smaller parts—neighborhoods, sub-neighborhoods, clusters, branches and finally the nodes and field devices. This helps in order to understand the performance related diagnostics.

Figure 5:
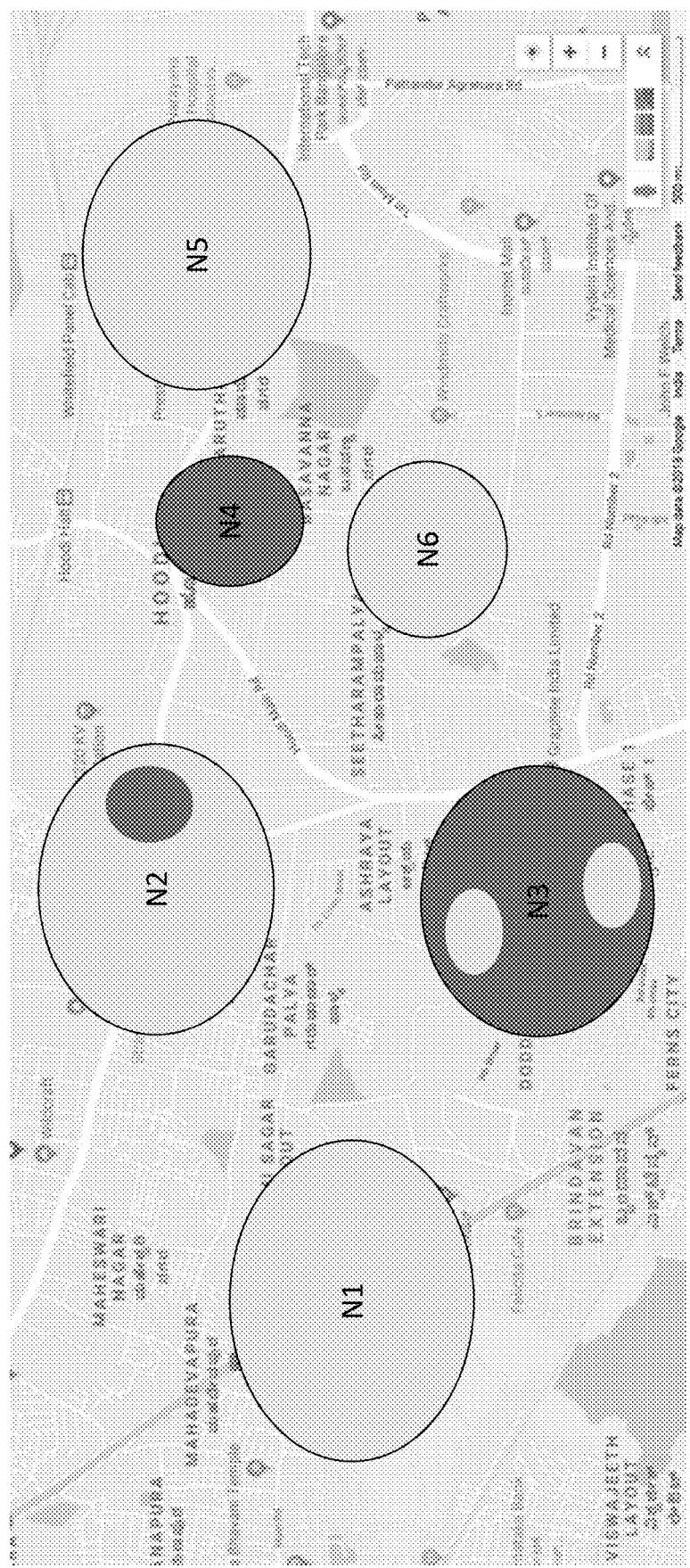
FIG. 5 shows condition of neighborhoods of the wireless network, in accordance with an embodiment.

As shown in FIG. 5, a wireless network can have several neighborhoods (N1, N3, N5 . . . ). Such neighborhoods are identified from information collected over a time period, and from analysis of the data. For various time instants, such representations may be generated according to health of access nodes, clusters and neighborhoods. At any point of time, some neighborhoods may be affected by performance issues (e.g. N1, N6).

Figure 6:
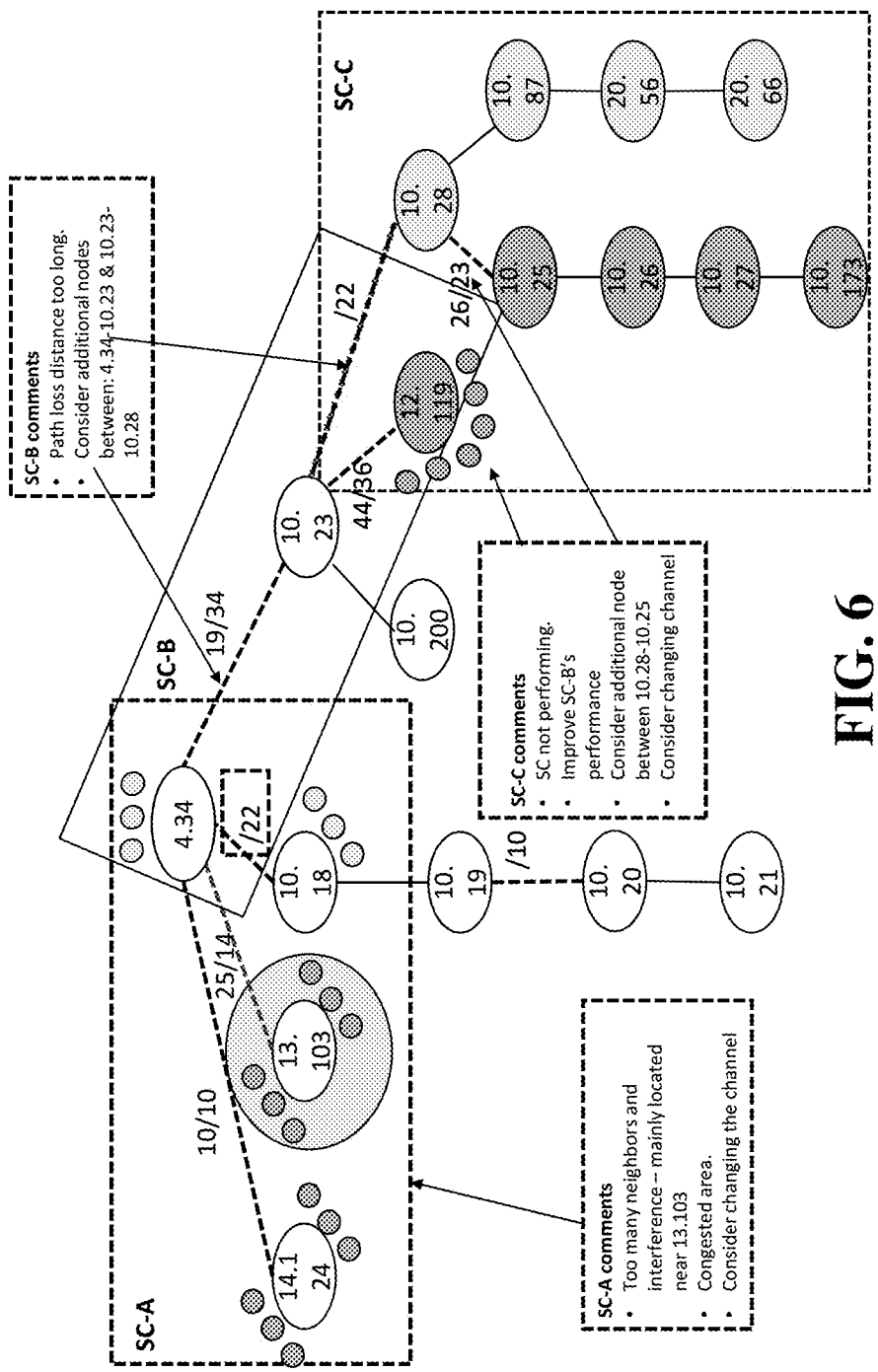
FIG. 6 shows condition of a cluster of access nodes, in accordance with an embodiment.

The performance of different clusters/sub-clusters may be seen for each neighborhood, along with suitable recommendations (as generated for the corresponding nodes/clusters). For example, as shown in FIG. 6, nodes in sub-cluster A (SC-A) may be affected by interference as a result of too many neighbors. Accordingly, a change of channel may be recommended. Similarly, nodes in SC-B may be affected due to path loss, and recommendation could be to add new nodes.

Given such determination, one can easily identify impacted field devices in the wireless network. Further, one can easily identify the affected communication ability of the associated field devices, to communicate with the network. The field device connectivity can have direct impact on the productivity of the industrial plant.

The network visualization can assist in quickly identifying which field devices are affected, as well as the likely cause for the affect and possible remedy. The recommendations when applied can alleviate the performance issues in the network and as a result the associated field device will be able to effectively communicate.

FIG. 6 shows that a performance issue in any part of the network can have a cascading effect on other network elements as well as the field devices. The field devices need not be directly connected with the access node in question, and therefore determination of the cause for the communication problem (i.e. upstream access node or gateway having a problem) becomes critical.

The invention claimed is:
1. A method for condition monitoring of a wireless network in an industrial plant, the wireless network comprising one or more wired gateways and a plurality of access nodes connected wirelessly with at least one of the one or more wired gateways, each access node being associated with at least one field device of a plurality of field devices, the method comprising:

periodically receiving information associated with packet transfer, channel access, and communication links from one or more of the one or more wired gateways and the plurality of access nodes;

estimating from the received information one or more parameters associated with each access node of the plurality of access nodes, the one or more parameters being estimated based on one or more of (i) a number of packets transmitted from the access node to a corresponding gateway, and a corresponding number of responses received from the corresponding gateway, (ii) a number of packets transmitted from the corresponding gateway to the access node, and a corresponding number of responses received from the access node, (iii) wireless communication channels used by the access node and one of a neighboring access node or the corresponding gateway, or (iv) a number of and identity of other access nodes and wired gateways connected with the access node, the one or more parameters comprising one or more of:

a channel error for each access node, the channel error for a first respective access node being determined based on a difference in the wireless communication channels used by the first respective access node and one of the neighboring access node or the corresponding gateway; or a stability factor for each access node, the stability factor for a second respective access node being determined based on a difference in one or more of the number of or the identity of the other access nodes and wired gateways connected with the second respective access node;

determining a connectivity status of each field device of the plurality of field devices based on the one or more parameters estimated for each access node; and rendering the connectivity status of each field device of the plurality of field devices on a user interface associated.

2. The method of claim 1, wherein the connectivity status of each field device is determined based on a connectivity status of one or more access nodes used by that field device for accessing the wireless network, at least a first access node connecting with a corresponding wired gateway via at least a second access node.

3. The method of claim 2, wherein rendering the connectivity status of each field device comprises displaying a connectivity status of one or more clusters of access nodes and a recommendation for at least one field device based on the connectivity status of that field device.

4. The method of claim 1, wherein determining the connectivity status of each field device comprises comparing a rate of packet transfer for each access node associated with that field device with a threshold value, the rate of packet transfer being a ratio of one of (i) the number of packets transmitted from the access node to the corresponding gateway compared to the corresponding number of responses received from the corresponding gateway or (ii) the number of packets transmitted from the corresponding gateway to the access node compared to the corresponding number of responses received from the access node.

5. The method of claim 4, wherein determining the connectivity status of each field device further comprises comparing one or more of (i) the wireless communication channels used by the access node and one of the neighboring access node and the corresponding gateway, (ii) the number of the other access nodes and wired gateways connected with the access node with a corresponding threshold value, or (iii) data traffic of the access node with a signal-to-noise ratio of the access node.

6. The method of claim 1, wherein the channel error is also determined based on a number of attempts made to switch the wireless communication channels by the first respective access node.

7. The method of claim 1, wherein the one or more parameters comprise a rate of data transfer for each access node, the rate of data transfer for each access node being determined based on a comparison of data traffic of the access node and a signal-to-noise ratio for the access node.

8. An industrial device for condition monitoring of a wireless network in an industrial plant, wherein the wireless network comprises one or more wired gateways and a plurality of access nodes connected wirelessly with at least one of the one or more wired gateways, wherein each access node is associated with at least one field device of a plurality of field devices, wherein the industrial device is connected with the one or more wired gateways, and wherein the industrial device comprises:

an input interface for periodically receiving information associated with packet transfer, channel access, and communication links from one or more of the one or more wired gateways and the plurality of access nodes; and a processor coupled to the input interface and configured to:

estimate from the received information one or more parameters associated with each access node of the plurality of access nodes, wherein the one or more parameters are estimated based on one or more of (i) a number of packets transmitted from the access node to a corresponding gateway, and a corresponding number of responses received from the corresponding gateway, (ii) a number of packets transmitted from the corresponding gateway to the access node, and a corresponding number of responses received from the access node, (iii) wireless communication channels used by the access node and one of a neighboring access node or the corresponding gateway, or (iv) a number of and identity of other access nodes and wired gateways connected with the access node, the one or more parameters comprising one or more of:

a channel error for each access node, wherein the channel error for a first respective access node is determined based on a difference in the wireless communication channels used by the first respective access node and one of the neighboring access node or the corresponding gateway; or a stability factor for each access node, wherein the stability factor for a second respective access node is determined based on a difference in one or more of the number of or the identity of the other access nodes and wired gateways connected with the second respective access node;

determine a connectivity status of each field device of the plurality of field devices based on the one or more parameters estimated for each access node; and render the connectivity status of each field device of the plurality of field devices on a user interface associated with the industrial device.

9. The industrial device of claim 8, wherein the processor is configured to determine the connectivity status of each field device based on a connectivity status of one or more access nodes used by that field device for accessing the wireless network, and wherein at least a first access node connects with a corresponding wired gateway via at least a second access node.

10. The industrial device of claim 9, wherein the processor configured to render the connectivity status of each field device comprises the processor configured to display a connectivity status of one or more clusters of access nodes and a recommendation for one or more field devices based on the connectivity status of that field device.

11. The industrial device of claim 8, wherein the processor configured to determine the connectivity status of each field device comprises the processor configured to compare a rate of packet transfer for each access node associated with that field device with a threshold value, wherein the rate of packet transfer is a ratio of one of (i) the number of packets transmitted from the access node to the corresponding gateway compared to the corresponding number of responses received from the corresponding gateway or (ii) the number of packets transmitted from the corresponding gateway to the access node compared to the corresponding number of responses received from the access node.

12. The industrial device of claim 11, wherein the processor configured to determine the connectivity status of each field device further comprises the processor configured to compare one or more of (i) the wireless communication channels used by the access node and one of the neighboring access nodes and the corresponding gateway, (ii) the number of the other access nodes and wired gateways connected with the access node with a corresponding threshold value, or (iii) data traffic of the access node with a signal-to-noise ratio of the access node.

13. The industrial device of claim 8, wherein the processor is further configured to determine the channel error based on a number of attempts made to switch the wireless communication channels by the first respective access node.

14. The industrial device of claim 8, wherein the one or more parameters comprise a rate of data transfer for each access node, and wherein the processor is configured to determine the rate of data transfer for each access node based on a comparison of data traffic of the access node and a signal-to-noise ratio for the access node.

15. The industrial device of claim 8, wherein the processor is further configured to estimate the one or more parameters associated with each access node based on data traffic of the access node.

16. The method of claim 1, wherein the one or more parameters associated with each access node are further estimated based on data traffic of the access node.

17. A method for condition monitoring of a wireless network in an industrial plant, the wireless network comprising one or more wired gateways and a plurality of access nodes connected wirelessly with at least one of the one or more wired gateways, each access node being associated with at least one field device of a plurality of field devices, the method comprising:
periodically receiving information associated with packet transfer, channel access, and communication links from one or more of the one or more wired gateways and the plurality of access nodes;
estimating from the received information one or more parameters associated with each access node of the plurality of access nodes, the one or more parameters being estimated based on one or more of (i) a number of packets transmitted from the access node to a corresponding gateway, and a corresponding number of responses received from the corresponding gateway, (ii) a number of packets transmitted from the corresponding gateway to the access node, and a corresponding number of responses received from the access node, (iii) wireless communication channels used by the access node and one of a neighboring access node or the corresponding gateway, or (iv) a number of and identity of other access nodes and wired gateways connected with the access node;
determining a connectivity status of each field device of the plurality of field devices based on the one or more parameters estimated for each access node, the determining comprising comparing a rate of packet transfer for each access node associated with that field device with a threshold value, the rate of packet transfer being a ratio of one of (i) the number of packets transmitted from the access node to the corresponding gateway compared to the corresponding number of responses received from the corresponding gateway or (ii) the number of packets transmitted from the corresponding gateway to the access node compared to the corresponding number of responses received from the access node; and
rendering the connectivity status of each field device of the plurality of field devices on a user interface.

18. The method of claim 17, wherein the one or more parameters associated with each access node are further estimated based on data traffic of the access node.

19. An industrial device for condition monitoring of a wireless network in an industrial plant, wherein the wireless network comprises one or more wired gateways and a plurality of access nodes connected wirelessly with at least one of the one or more wired gateways, wherein each access node is associated with at least one field device of a plurality of field devices, wherein the industrial device is connected with the one or more wired gateways, and wherein the industrial device comprises:
an input interface for periodically receiving information associated with packet transfer, channel access, and communication links from one or more of the one or more wired gateways and the plurality of access nodes; and
a processor coupled to the input interface and configured to:
estimate from the received information one or more parameters associated with each access node of the plurality of access nodes, wherein the one or more parameters are estimated based on one or more of (i) a number of packets transmitted from the access node to a corresponding gateway, and a corresponding number of responses received from the corresponding gateway, (ii) a number of packets transmitted from the corresponding gateway to the access node, and a corresponding number of responses received from the access node, (iii) wireless communication channels used by the access node and one of a neighboring access node or the corresponding gateway, or (iv) a number of and identity of other access nodes and wired gateways connected with the access node;
determine a connectivity status of each field device of the plurality of field devices based on the one or more parameters estimated for each access node, wherein the processor configured to determine the connectivity status of each field device comprises the processor configured to compare a rate of packet transfer for each access node associated with that field device with a threshold value, wherein the rate of packet transfer is a ratio of one of (i) the number of packets transmitted from the access node to the corresponding gateway compared to the corresponding number of responses received from the corresponding gateway or (ii) the number of packets transmitted from the corresponding gateway to the access node compared to the corresponding number of responses received from the access node; and render the connectivity status of each field device of the plurality of field devices on a user interface associated with the industrial device.

20. The industrial device of claim 19, wherein the processor is further configured to estimate the one or more parameters associated with each access node based on data traffic of the access node.

\* \* \* \* \*